April 15, 1969   J. DUNOD   3,438,275
NON-ROTATING TOOL HOLDER OR CARRIER FOR A VIBRATING TOOL
Filed June 6, 1967
Fig: 1
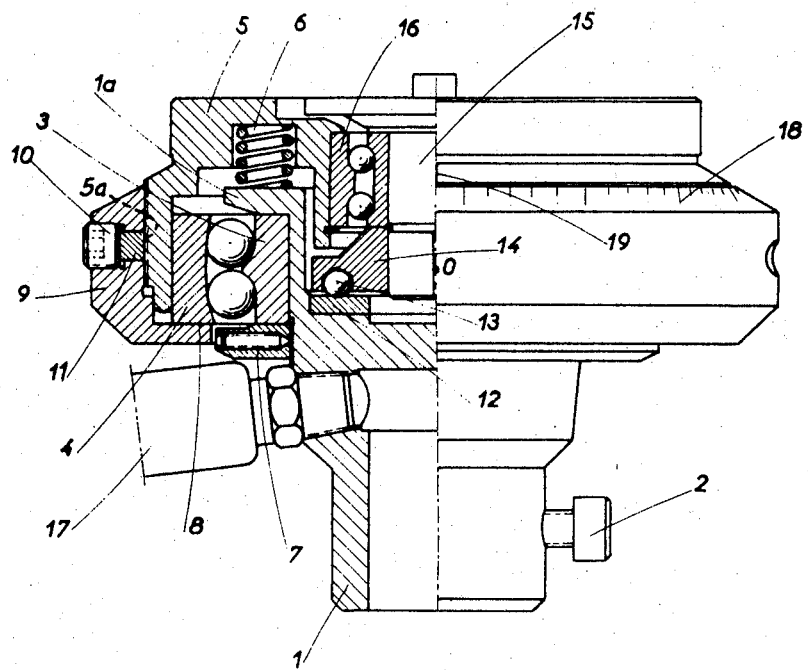
Fig: 2
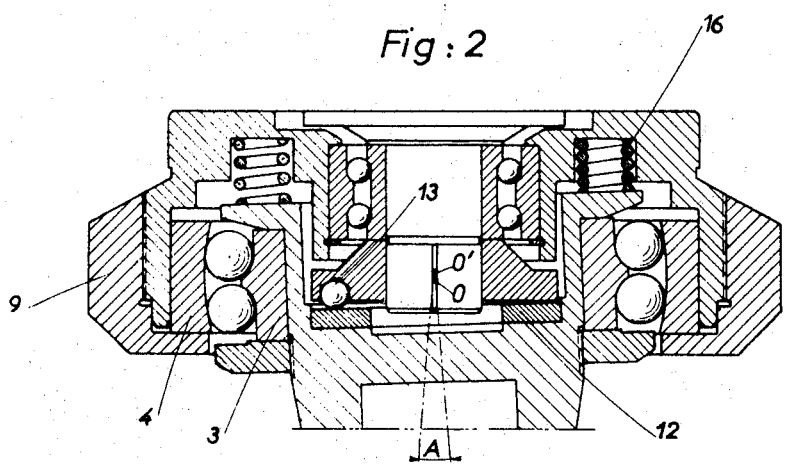

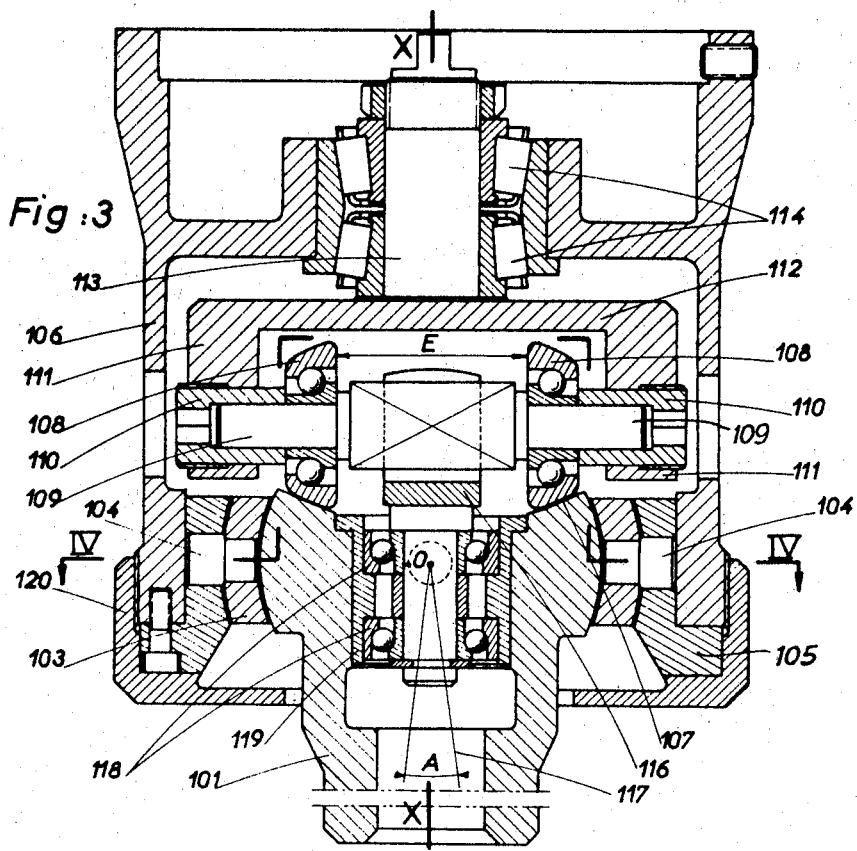

United States Patent Office 3,438,275
Patented Apr. 15, 1969

3,438,275
NON-ROTATING TOOL HOLDER OR CARRIER FOR A VIBRATING TOOL
Jean Dunod, Paris, France, assignor to Qualitex Dunod & Cie, Paris, France, a company of France
Filed June 6, 1967, Ser. No. 643,955
Claims priority, application France, June 10, 1966, 65,084; May 16, 1967, 106,547
Int. Cl. F16h 37/12
U.S. Cl. 74—86                                                5 Claims

ABSTRACT OF THE DISCLOSURE

A non-rotating tool holder for a vibrating tool has a stationary body supporting a rotating drive shaft and a non-rotating head for securing the vibrating tool. The head is suspended on the stationary body by a universal joint centered on the axis of the drive shaft. The head has a circular surface engaged by at least one eccentric element disposed on the drive shaft. The distance between the point of engagement of the eccentric element on the circular path and the transverse plane passing through the center of the universal joint is adjustable to determine, by the inclination of the axis of the head around such center, the angle of a nodding movement of such axis around the drive shaft axis.

---

This invention relates to a non-rotating tool holder or carrier for a vibrating tool.

A tool carrier of this kind is of use more particularly for tools such as the electrodes used in electroerosion and electro-chemistry, where the tool end is required to vibrate in a plane perpendicular to the tool-carrier axis while the tool axis simultaneously performs an oscillating rotating movement or nodding movement around the tool-carrier axis.

The tool carrier according to the invention makes it possible to control the amplitude of the vibratory movements.

According to the invention, the tool holder comprises a stationary body supporting a rotating drive shaft and a non-rotating head for holding the vibrating tool, the head being suspended on the stationary body by a universal joint whose center is disposed on the axis of the drive shaft. The head has a circular surface receiving at least one eccentric element disposed on the drive shaft. The distance between the bearing point of the eccentric element on the circular path and the transverse plane passing through the center of the universal joint is adjustable and determines, by the inclination of the axis of the head around such center, the angle of a nodding movement of such axis around the drive shaft axis.

The invention will be described hereinafter with reference to exemplary embodiments shown in the accompanying drawings wherein:

FIGURE 1 is a view in half-section through the tool-carrier axis;

FIGURE 2 is a partial view, in section, of FIGURE 1 showing the tool-securing head in an inclined position;

FIGURE 3 is a sectional view similar to FIGURE 1 and shows a variant of the tilting drive for the tool-securing head.

Figure 4:
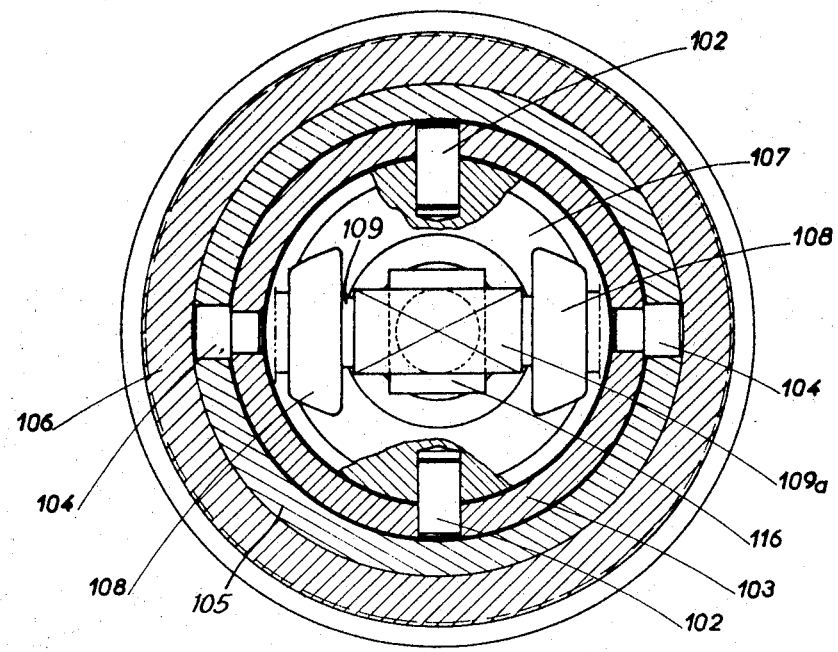
FIGURE 4 is a cross-section on the line IV—IV of FIGURE 3.

Referring to FIGURE 1, a tool-carrier head 1 has a screw 2 for securing a tool (not shown) and is centered by an inner race 3 of a spherical anti-friction bearing whose outer race 4 is centered in a stationary body 5. A number of springs 6 urge head 1 into bearing engagement with inner race 3 by way of a collar 1a. Head 1 can be locked axially to race 3 by rotation of a nut 7.

Outer race 4 bears on an annular surface 8 in a nut 9 which is screwed to body 5 and immobilised by means of a locking screw 10 acting on a cylindrical soft metal member 11 bearing on screw threads 5a in body 5.

Head 1 has an annular surface 12 in bearing engagement with a ball 13 mounted eccentrically in a rotating disc 14 rigidly secured to a tool-carrier drive shaft 15 centered by an anti-friction thrust bearing 16 in body 5 and rotated by a motor (not shown). Head 1 may have a liquid supply inlet 17.

In the position shown in FIGURE 1, races 3 and 4 are both oriented in the same transverse plane and the center of the spherical anti-friction bearing is located at O. With the center O in this position, circular motion of the ball 13 has no effect on the position of the head 1.

If, as shown in FIGURE 2, nut 9 is rotated to shift the outer race 4, the center of the spherical bearing moves to O'; the inner race 3 takes up an inclination or tilt due to the new position O' of the center and because of the bearing relationship between the ring 12 and ball 13. Consequently, the axis of the tool head passes through the center O' and the rotation of the disc 14 produces a nodding movement of the latter axis relatively to the center O.

The angle A of the nodding movement depends upon the angular position of the nut 9, and such position can be read on a scale 18 which is marked on the nut 9 and which co-operates with a fixed mark 19 (FIGURE 1). Measurement of the movement of the center O is limited to the pitch of the screw threads 5a, but the corresponding variation of the nodding angle is sufficient for electro-erosion requirements. Larger variations can be provided by using reading means on adjusting nut 9 for a number of revolutions of the nut. The amplitude of tool vibrations depends upon the nodding movement angle A and the frequency of the vibrations corresponds to the angular velocity of the shaft 15.

Instead of using a rotating support in the form of a ball, two adjacent balls can be used whose points of engagement with the circular path form an axis which, in co-operation with the center of the anti-friction bearing, defines the tilt of the tool head axis. If required, the support for the ball can be provided by a rolling element, such as a convex rolling surface, disposed on a spindle rigidly secured to the rotating disc 14.

In the embodiment shown in FIGURES 3 and 4, the universal joint of a spherical anti-friction bearing is replaced by a Cardan articulation. A non-rotating tool-holding head 101 is articulated by way of two spindles 102 to a gimbal ring 103 articulated by two spindles 104 to a stationary ring 105 centered in the stationary body 106 of the tool carrier. Head 101 is formed with an annular trunco-conical raceway or the like 107 supporting two coaxial rollers 108 which are trunco-conical in general shape, the rolling surfaces of the rollers 108 being slightly convex. The two rollers 108 are mounted with an equal spacing E and rotate freely on a transverse spindle 109 centered and shouldered in two rings 110 screwed into two protuberances 111 on a disc 112 which is rigidly secured to a rotating drive shaft 113. Drive shaft 113 is mounted in antifriction thrust bearings 114 in the stationary body 106.

The central part of spindle 109 at 109a is of rectangular cross-section and its two side surfaces are received in and engage a cover 116 of spindle 117 coaxial with head 101. Spindle 117 is mounted in two anti-friction thrust bearings 118 in a ring 119 which is rigidly secured to head 101. A cover 120 is screwed to the body 106 and is formed with a central aperture through which the head 101 extends.

When the two rollers 108 are in the symmetrical position as shown relatively to the tool carrier axis X—X, the axis of the head 101 is coincident with the axis of drive shaft 113 during rotation thereof. Unscrewing one of the rings 110 and screwing up the opposite ring 110 correspondingly shifts the two rollers 108 into a number of positions each defining a particular tilt of the axis of the head 101 passing through the center O of the Cardan suspension. When the shaft 113 is rotated, the rollers 108 make the axis of head 101 perform a nodding movement relative to the axis X—X of a cone of angle A, the cone apex being at the center O of the Cardan suspension.

The conicities of the rollers 108 and of the surface 107 can be such that the rollers, while running at different speeds, always remain in contact with the surface and therefore maintain constant the tilt of the head axis in the vertical plane passing through the axis of the spindle 109. By maintaining the axis of the head 101 in the latter plane, the element 116 prevents any tilting of the axis in any other plane due to the corresponding biasing of the Cardan suspension by the tool.

For transverse displacement of the system formed by the spindle and rollers, a micrometer adjustment can be provided based on screw threads of different pitches on the adjusting rings 110 in the protuberances 111 of the disc 112.

What I claim is:

1. A non-rotating tool holder for a vibrating tool comprising a stationary body supporting a rotating drive shaft and a non-rotating head for holding the vibrating tool, the head being secured on the stationary body by a universal joint centered on the axis of the drive shaft; a circular surface in the head supporting at least one rotary eccentric element mounted on the drive shaft; and means for adjusting the distance between the point of engagement of the eccentric element on the circular surface and the transverse plane passing through the center of the universal joint and for determining, by the inclination of the axis of the head around such center, the angle of a nodding movement of such axis around the drive shaft axis.

2. A non-rotating tool holder for a vibrating tool comprising a stationary body supporting a rotating drive shaft and a non-rotating head for holding the vibrating tool, the head being secured on the body by a universal joint centered on the axis of the drive shaft, a circular surface in the head supporting at least one rotary eccentric element mounted on the drive shaft and means for adjusting the distance between the point of engagement of the eccentric element on the circular surface and the transverse plane passing through the center of the universal joint and for determining by the inclination of the axis of the head around this center the angle of nodding movement of this axis around the axis of the drive shaft, the universal joint being formed with a plane circular surface perpendicular to its axis and supporting at least one element mounted in an eccentric position on the rotating drive shaft in point bearing engagement.

3. A non-rotating tool holder for a vibrating tool comprising a stationary body supporting a rotating drive shaft and a non-rotating head for holding the vibrating tool, the head being secured on the body by a universal joint centered on the axis of the drive shaft, a circular surface in the head supporting at least one rotary eccentric element mounted on the drive shaft and means for adjusting the distance between the point of engagement of the eccentric element on the circular surface and the transverse plane passing through the center of the universal joint and for determining by the inclination of the axis of the head around this center the angle of nodding movement of this axis around the axis of the drive shaft, the universal joint being a Cardan joint coaxial of the rotating drive shaft; the tool holding head being articulated to the oscillating ring of the universal joint; a trunco-conical surface on the head, two trunco-conical rollers engaging the surface, the rollers being disposed diametrically opposite one another and rotating freely on a common transverse spindle whose axis is perpendicular to the drive shaft axis the spindle being mounted on the drive shaft, the spindle and rollers being movable transversely to incline the axis of the tool holding head around the center of the Cardan joint in a plane passing through the drive shaft axis, the axis of the tool holding head being maintained in such plane by means of a rotating connection between the head and the spindle.

4. A tool carrier as set forth in claim 3, transverse movement of the system formed by the spindle and rollers being adjusted through rings centering and abutting the spindle and screwed into an element rigidly secured to the drive shaft.

5. A tool carrier as set forth in claim 3, the rotating connection between the head and the spindle including an element guided on the spindle and rotatably and axially mounted on the head.

References Cited

UNITED STATES PATENTS 2,256,134   9/1941   Bornay _____ 74—86
2,713,637   7/1955   Wuerth et al. _____ 74—86

FRED C. MATTERN, Jr., *Primary Examiner.*

F. D. SHOEMAKER, *Assistant Examiner.*

U.S. Cl. X.R.

219—69